(12) United States Patent
Chen et al.

(10) Patent No.: US 10,884,250 B2
(45) Date of Patent: Jan. 5, 2021

(54) APPARATUS AND METHOD FOR LASER BEAM SHAPING AND SCANNING

(71) Applicant: The Chinese University of Hong Kong, Hong Kong (CN)

(72) Inventors: Shih-Chi Chen, Hong Kong (CN); Qiang Geng, Hong Kong (CN); Dien Wang, Hong Kong (CN); Pengfei Chen, Hong Kong (CN); Dapeng Zhang, Hong Kong (CN)

(73) Assignee: The Chinese University of Hong Kong, Hong Kong (CN)

( * ) Notice: Subject to any disclaimer, the term of this patent is extended or adjusted under 35 U.S.C. 154(b) by 0 days.

(21) Appl. No.: 16/525,245

(22) Filed: Jul. 29, 2019

(65) Prior Publication Data

US 2019/0353912 A1    Nov. 21, 2019

Related U.S. Application Data

(63) Continuation-in-part of application No. 16/290,743, filed on Mar. 1, 2019, now Pat. No. 10,821,671,
(Continued)

(51) Int. Cl.
*H04N 7/18* (2006.01)
*G02B 27/09* (2006.01)
(Continued)

(52) U.S. Cl.
CPC ..... *G02B 27/0944* (2013.01); *G02B 26/0833* (2013.01); *G02B 27/0933* (2013.01);
(Continued)

(58) Field of Classification Search
CPC ... B29C 64/277; B29C 64/268; B29C 64/135; G03H 1/2205; G03H 1/0005;
(Continued)

(56) References Cited

U.S. PATENT DOCUMENTS 8,320,031 B1 * 11/2012 Sox .................. G02B 26/06
  359/9
2008/0218817 A1 * 9/2008 Grygier ............... G03H 1/30
  359/9

(Continued)

OTHER PUBLICATIONS

K. Dholakia, et al.; "Shaping the future of manipulation" Nature Photonics, vol. 5, Jun. 2011; pp. 335-342.
(Continued)

*Primary Examiner* — Richard T Torrente
(74) *Attorney, Agent, or Firm* — Knobbe Martens Olson & Bear LLP

(57) ABSTRACT

An apparatus and a method for laser beam shaping and scanning. The apparatus includes a digital micromirror device (DMD) including a plurality of micromirrors, configured to receive a first laser beam, adjust an axial position of a focal point of the first laser beam along a moving direction of the first laser beam by controlling a focal length of wavefront of a binary hologram applied to the DMD, and adjust a lateral position of the focal point on a plane perpendicular to the moving direction by controlling a tilted angle of a fringe pattern and a period of fringes of the binary hologram applied to the DMD, wherein the DMD simultaneously functions as programmable binary mask and a blazed grating.

12 Claims, 10 Drawing Sheets
(9 of 10 Drawing Sheet(s) Filed in Color)

Related U.S. Application Data which is a continuation-in-part of application No. 14/860,461, filed on Sep. 21, 2015, now Pat. No. 10,401,603.

(60) Provisional application No. 62/639,245, filed on Mar. 6, 2018.

(51) Int. Cl.
  G02B 26/08 (2006.01)
  G03H 1/00 (2006.01)
  G02B 21/00 (2006.01)
  G02B 27/00 (2006.01)

(52) U.S. Cl.
  CPC ....... *G03H 1/0005* (2013.01); *G02B 21/0032* (2013.01); *G02B 21/0048* (2013.01); *G02B 27/0037* (2013.01); *G03H 2001/0094* (2013.01)

(58) Field of Classification Search
  CPC ..... G03H 2001/221; G03H 2001/2218; G03H 2222/33; G03H 2225/24; G03H 2222/36; G03H 2223/24; G03H 2001/0094; B33Y 10/00; B33Y 30/00
  See application file for complete search history.

(56) References Cited

U.S. PATENT DOCUMENTS

| | | | | |
|---|---|---|---|---|
| 2009/0238217 | A1* | 9/2009 | Moser | H01S 5/4062 372/20 |
| 2012/0069344 | A1* | 3/2012 | Liu | G02B 5/008 356/450 |
| 2013/0003073 | A1* | 1/2013 | Yu | G03H 1/0443 356/457 |
| 2016/0199935 | A1* | 7/2016 | Chen | B23K 26/0624 219/121.61 |
| 2016/0274539 | A1* | 9/2016 | Smithwick | G02B 5/32 |

OTHER PUBLICATIONS

Shu Jia, et al.; "Isotropic three-dimensional super-resolution imaging with a self-bending point spread function" Nature Photonics | vol. 8 | Apr. 2014, pp. 302-306.
Planchon, et al.; "Rapid three-dimensional isotropic imaging of living cells using Bessel beam plane illumination" Nature Methods | vol. 8 No. 5 | May 2011 | pp. 417-426.
Fernández-Suárez, et al.; "Fluorescent probes for super-resolution imaging in living cells" Nature Reviews | Molecular Cell Biology; vol. 9, Dec. 2008, pp. 929-943.
Vaughan, et al.; "New fluorescent probes for super-resolution imaging" Nature Biotechnology, vol. 29, No. 10, Oct. 2011, pp. 880-881.
R. Kodama, et al.; "Fast heating of ultrahigh-density plasma as a step towards laser fusion ignition" Nature, vol. 412, Aug. 23, 2001, pp. 798-802.
McLeod, et al.; "Subwavelength direct-write nanopatterning using optically trapped microspheres" Nature Nanotechnology, vol. 3, Jul. 2008, pp. 413-417.
Hahn, et al.; "Real-time digital holographic beam-shaping system with a genetic feedback tuning loop" Applied Optics, vol. 45, No. 5, Feb. 10, 2006, pp. 915-924.
Bahk, et al.; "A high-resolution, adaptive beam-shaping system for high-power lasers" Optics Express, vol. 18, No. 9, Apr. 26, 2010, pp. 9151-9163.
Fatemi, et al.; "Generation of hollow beams by using a binary spatial light modulator" Optics Letters, vol. 31, No. 7, Apr. 1, 2006, pp. 864-866.
Chattrapiban, et al.; "Generation of nondiffracting Bessel beams by use of a spatial light modulator" Optics Letters, vol. 28, No. 22, Nov. 15, 2003, pp. 2183-2185.
Bagnoud, et al.; "Independent phase and amplitude control of a laser beam by use of a single-phase-only spatial light modulator" Optics Letters, vol. 29, No. 3, Feb. 1, 2004, pp. 295-297.
M. Reicherter, et al.; "Optical particle trapping with computer-generated holograms written on a liquid-crystal display" Optics Letters, vol. 24, No. 9, May 1, 1999; pp. 608-610.
H. Kück, et al.; "Deformable micromirror devices as phase-modulating high-resolution light valves" Sensors and Actuators A 54, (1996) pp. 536-541.
Nemoto, et al.; "Optimum control of the laser beam intensity profile with a deformable mirror" Applied Optics, vol. 36, No. 30, Oct. 20, 1997; pp. 7689-7695.
Gong, et al.; "Observation of the asymmetric Bessel beams with arbitrary orientation using a digital micromirror device" Optics Express, vol. 22, No. 22, Nov. 3, 2014; pp. 26763-26776.
Lerner, et al.; "Shaping Laguerre-Gaussian laser modes with binary gratings using a digital micromirror device" Optics Letters, vol. 37, No. 23, Dec. 1, 2012; pp. 4826-4828.
Dufour, et al.; "Two-photon excitation fluorescence microscopy with a high depth of field using an axicon" Applied Optics, vol. 45, No. 36, Dec. 20, 2006; pp. 9246-9252.
A. Piskarskas, et al.; "Noncollinear second-harmonic generation in periodically poled KTiOPO4 excited by the Bessel beam" Optics Letters, Vo. 24, No. 15, Aug. 1, 1999; pp. 1053-1055.
Polynkin, et al.; "Curved Plasma Channel Generation Using Ultraintense Airy Beams" Science vol. 324, Apr. 10, 2009; pp. 229-232.
Gattass, et al.; "Femtosecond laser micromachining in transparent materials" Nature Photonics, vol. 2, Apr. 2008; pp. 219-225.
Chong, et al.; "Airy-Bessel wave packets as versatile linear light bullets" Nature Photonics, vol. 4, Feb. 2010; pp. 103-106.
Akturk, et al.; "Pulse-front tilt caused by spatial and temporal chirp" Optics Express, vol. 12, No. 19, Sep. 20, 2004; pp. 4399-4410.
Wai-Hon Lee; "Binary Synthetic Holograms" Applied Optics, vol. 13, No. 7, Jul. 1974; pp. 1677-1682.
Bryngdahl, et al.; "Laser beam scanning using computer-generated holograms" Applied Optics, vol. 15, No. 1, Jan. 1976; pp. 183-194.
Reddy, et al.; "Three-dimensional random access multiphoton microscopy for functional imaging of neuronal activity" Nature Neuroscience, vol. 11, No. 6, Jun. 2008; pp. 713-720.

* cited by examiner

APPARATUS AND METHOD FOR LASER BEAM SHAPING AND SCANNING

CROSS-REFERENCE TO RELATED APPLICATIONS

This application is a continuation-in-part of U.S. application Ser. No. 16/290,743, filed Mar. 1, 2019, which is a continuation-in-part of U.S. application Ser. No. 14/860,461 filed Sep. 21, 2015, and claims priority to U.S. Provisional Application No. 62/639,245 filed Mar. 6, 2018. All of the aforementioned applications are incorporated herein by reference in their entireties.

TECHNICAL FIELD

The disclosure relates to laser beam shaping and scanning, in particular, to an apparatus, and a method for laser beam shaping and scanning.

BACKGROUND

Laser beam shaping, i.e., modulation of the phase, mode and amplitude of a laser beam, is an important technology that enables many practical laser applications. Specific laser beam modes, such as Airy beam, Bessel beam and Laguerre-Gaussian (LG) beam, enable critical applications in optical manipulation, biomedical imaging, laser fusion and material processing etc. Accordingly, various beam shaping techniques have been proposed and developed. The most effective and common laser beam shaper is designed with a spatial light modulator (SLM). For example, a liquid crystal (LC)-based SLM achieves arbitrary beam shaping with good efficiency and resolution for both continuous-wave (CW) and pulsed lasers. Alternatively, beam shapers can be designed with a deformable mirror (DM) device, which can generate arbitrary phase or amplitude profiles. Although the aforementioned methods are effective and commercially available, they are limited by the shaping rate and resolution, i.e., the LC-SLM can only operate at 100 s Hz and a typical DM device has less than 10,000 pixels.

A digital micromirror device (DMD) can be considered as a programmable binary mask, consisting of several million micromirrors. Each micromirror is an independent pixel with two stable angular positions, i.e., ±12°. Recently, the DMD has been reported to shape continuous wave (CW) lasers. The DMD is a promising device for next-generation laser beam shapers for the following reasons: (1) broad wavelength range, i.e., from ultraviolet (~320 nm) to far infrared (~2500 nm) with appropriate coatings; (2) high pattern rate, up to 32.5 kHz; (3) high damage threshold; and (4) insensitivity to polarization. Despite these advantages, applications of DMD in beam shaping methods have been limited to CW lasers to date due to the complexity involved in compensating the dispersion in pulsed lasers.

As ultrafast lasers such as femtosecond lasers are essential to a myriad of scientific and industrial applications, e.g., two-photon excited (TPE) microscopy, second-harmonic generation, laser filamentation, micro machining and light bullet generation, new high-speed and high resolution femtosecond beam shaping technologies may facilitate a multitude of new scientific studies and applications. The extension of DMD technologies to ultrafast lasers can thus advance the performance limit of conventional beam shaping methods.

Laser scanning microscopy is an important imaging method that is typically performed via raster-scanning the focus of a laser in samples with submicron resolution. Although it enables submicron resolution in both lateral and axial directions, the imaging rate is limited by the point-by-point and layer-by-layer serial scanning procedure. While parallel imaging methods have been proposed, e.g., parallel scanning with multiple photomultiplier tubes (PMT), they are often limited to high cost.

SUMMARY

In an aspect of the disclosure, an apparatus for laser beam shaping and scanning is provided. The apparatus includes a digital micromirror device (DMD) including a plurality of micromirrors, configured to receive a first laser beam, adjust an axial position of a focal point of the first laser beam along a moving direction of the first laser beam by controlling a focal length of wavefront of a binary hologram applied to the DMD, and adjust a lateral position of the focal point on a plane perpendicular to the moving direction by controlling a tilted angle of a fringe pattern and a period of fringes of the binary hologram applied to the DMD, where the DMD simultaneously functions as programmable binary mask and a blazed grating.

In another aspect of the disclosure, a method for laser beam shaping and scanning is provided. The method includes: receiving, by a digital micromirror device (DMD), a first laser beam; adjusting an axial position of a focal point of the first laser beam along a moving direction of the first laser beam by controlling a focal length of wavefront of a binary hologram applied to the DMD; and adjusting a lateral position of the focal point on a plane perpendicular to the moving direction by controlling a tilted angle of a fringe pattern and a period of fringes of the binary hologram applied to the DMD, where the DMD simultaneously functions as programmable binary mask and a blazed grating.

BRIEF DESCRIPTION OF THE DRAWINGS

The patent or application file contains at least one drawing executed in color. Copies of this patent or patent application publication with color drawing(s) will be provided by the Office upon request and payment of the necessary fee Embodiments of the disclosure are illustrated by way of example and not limitation in the figures of the accompanying drawings in which like references indicate similar elements.

DETAILED DESCRIPTION OF THE PREFERRED EMBODIMENTS

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

It should also be noted that the embodiments in the present disclosure and the features in the embodiments may be combined with each other on a non-conflict basis. The present disclosure will be described below in detail with reference to the accompanying drawings and in combination with the embodiments The embodiments of disclosure present a method that generates dynamic binary masks via a digital micromirror device (DMD) to manipulate and correct the wavefront of a pulsed laser, i.e. a DMD-based Ultrafast Beam Shaper (DUBS). Pulsed lasers are widely used in biomedical imaging, fiber optics, spectroscopy, manufacturing, lithography and high-field physics etc. Beam shaping is a process that shapes the distribution of the amplitude and phase of electromagnetic waves, namely, the wavefront of a beam. Beam shaping has extensive applications comprising laser scanning microscopy, endomicroscopy, material processing, optical communication, 3D printing and frontier physics-chemical research. In addition, applications in optical tweezer and super-resolution also require the beam profile to be shaped like a "doughnut". Comparing with existing beam shaping technologies, the DMD-based beam shaper according to some embodiments has the following advantages: (1) broad band ranging from ultraviolet (UV) to far infrared when coated appropriately, (2) high pattern rate up to 32 kHz, (3) high damage threshold, (4) insensitivity to polarization, and (5) low cost. The DMD-based beam shaper according to some embodiments provides precision control for ultrahigh speed wavefront manipulation of pulsed laser beams and thus enables diverse high-speed applications.

Figure 1:
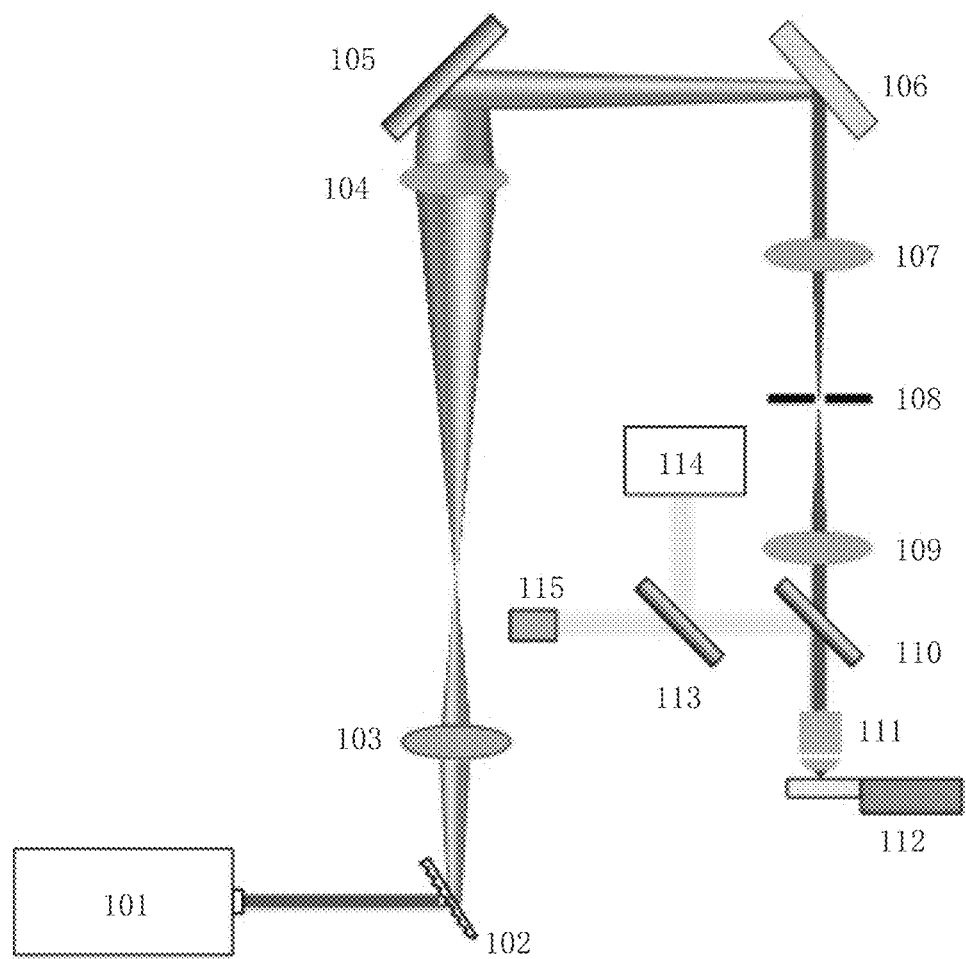
FIG. 1 is an illustrative optical configuration of an apparatus according to some embodiments of the disclosure.

An illustrative embodiment of the apparatus for laser beam shaping and scanning is shown in FIG. 1. As an example, the laser source 101 is a regenerative femtosecond Ti: sapphire laser amplifier (Spectra-Physics, Spitfire Pro) with a center wavelength of 800 nm. The laser is configured to have a repetition rate of 10 kHz with 100 fs pulse width and 4 W average power. An alternative choice of the laser source may be a Ti: sapphire laser (Coherent, Chameleon Ultra II, 3.5 W at 800 nm; repetition rate: 80 MHz). A conservative calculation indicates the laser amp can simultaneously process 100+ focal points with sufficient energy for TPP, while the oscillator can process 15 points.

First, the laser beam issued from the laser source 101 is appropriately expanded by two achromatic lenses (L1, L2) 103 and 104 to ensure the DMD aperture (DLP 4100 0.7" XGA, 1024×768 pixels, Texas Instrument) is fully filled. Lenses L1 and L2 together form a beam expander. As the DMD 106 functions both as a programmable binary hologram and a blazed grating, it introduces negative angular dispersion to the laser beam. To remove the angular dispersion, a blazed transmission grating 102 and a mirror (M1) 105 are included in the light path to generate positive angular dispersion. The blazed transmission grating 102 and the mirror (M1) 105 collectively function as a dispersion compensation unit. The mirror M1 105 may be a high-reflectivity mirror. After the DMD 106, the dispersion-free laser beam is guided to an infinity-corrected objective lens 111 via a 1:1 telescope, consisting of an achromatic lens L3 107 and a tube lens L4 109. An iris diaphragm 108 is placed at the back focal plane of L3 to spatially select the $-1^{st}$ order diffraction of the binary hologram. The photoresists are mounted on a motorized precision XYZ stage 112 for positioning. To monitor the fabrication process in situ, a microscopic imaging system may be built in conjunction with the fabrication setup. As shown in FIG. 1, the microscope shares the objective with the fabrication system via a dichroic mirror 110. An epi-illumination light source 115 is coupled into the system for sample illumination. The image/video of the fabrication process is recorded by a CCD camera 114 after the 50:50 beam splitter (BS) 113.

Hereinafter, features related to the apparatus for laser beam shaping and scanning will be described in details.

Dispersion Compensation

Dispersion compensation is critical to the DMD scanner and the related parameters can be determined mathematically. The general form of grating equation is given by $$d(\sin\theta_i + \sin\theta_m) = m\lambda, \quad (1)$$

where d is the distance of groove centers; m is an integer that specifies the diffraction order; $\theta_i$ and $\theta_m$ are incident angle and diffraction angle at the $m^{th}$ diffraction order respectively. Differentiating Eq. 1 yields the angular dispersion $\partial\theta_m/\partial\lambda = m/(d \cdot \cos\theta_m)$. Hence, the ratio of cone angles $\Delta\theta_G$ and $\Delta\theta_D$ can be written as $$\frac{\Delta\theta_G}{\Delta\theta_D} = \frac{m_G d_D \cos\theta_{iD}}{m_G d_D \cos\theta_{mG}}, \quad (2)$$

where the subscripts G and D denote the related parameters of the grating and DMD respectively. L1 and L2 form a 4-f optical configuration to expand the beam size and adjust the dispersion angle after the grating. Accordingly, the angular dispersion introduced by DMD is entirely compensated. As $\Delta\theta_G$ and $\Delta\theta_D$ are small, they can be approximated as:

$$\frac{\Delta\theta_G}{\Delta\theta_D} \approx \frac{f_{L2}}{f_{L1}}, \tag{3}$$

The important parameters in this setup include the central wavelength, $\lambda$=800 nm; pixel size of the DMD, $d_D$=19.35 μm; pitch of the grating, $d_G$=0.83 μm; the diffraction order of the grating and DMD, $m_G$=1 and $m_D$=10 respectively; and the corresponding diffraction angle, $\theta_{mG}$=27°, $\theta_{iD}$=17° respectively. Substituting these values into Eq. 2 and Eq. 3, there is a relationship $f_{L2}$=2.5×$f_{L1}$, thus $f_{L1}$=100 mm and $f_{L2}$=250 mm may be chosed to fully compensate the angular dispersion introduced by DMD, where $f_{L1}$ is a focal length of lense L1, and fie is a focal length of lense L2. Note that when employing different DMD units or models or gratings, a suitable 4-f system can always be found to compensate the angular dispersion because $\theta_{iD}$ can be adjusted continuously.

Random-Access Imaging

Applying the specific patterns on the DMD, ultrafast speed in-plane (lateral) scanning, i.e., x-axis and y-axis, of the focal point of the pulsed laser can also be achieved via the apparatus. In addition, lateral (x and y) and axial (z) scanning can be combined based on the principle of superposition, realizing ultrafast "random-access scanning"—popular technique in laser scanning microscopy, which conventionally are performed using a piezoelectric actuator or a pair of acousto-optic deflector (AOD) to scan.

Figure 2:
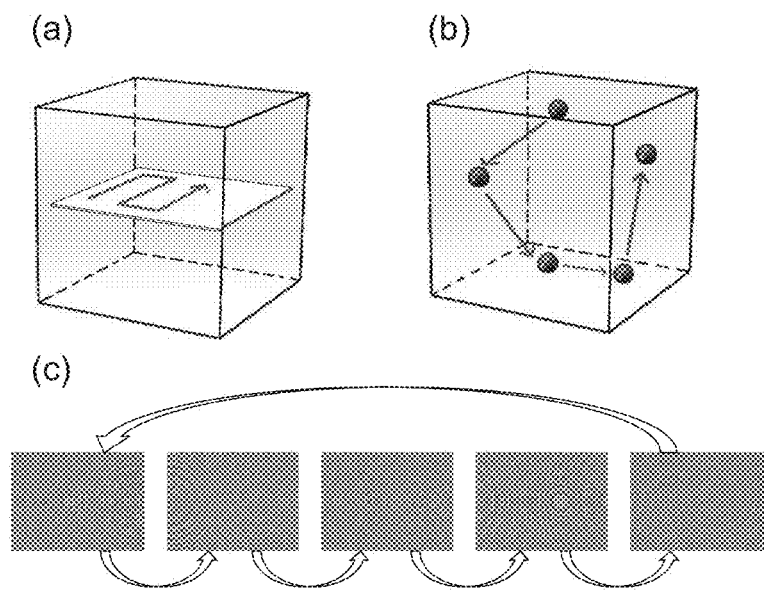
FIG. 2 illustrates raster-scanning and random-access scanning.

As many biological events, e.g., signaling of neural circuits, sparsely occur at different depths simultaneously, fast axial scanning and random-access scanning become highly desired functions in microscopes that realize in vivo high-speed volumetric imaging. Conventionally, axial scanning is performed by a sample positioner that move the sample axially to obtains 2D images sequentially at low speeds (~0.1 Hz) for volumetric imaging, FIG. 2(a) shows the scanning mechanism. Moreover, even the system is equipped with mechanical scanners that are faster enough to perform real-time (i.e., >30 Hz) 3-D scanning, this layer-by-layer scanning mechanism is not able to guarantee enough signal-to-noise ratio, since each pixel couldn't receive enough pulses. An effective way to maintain enough pixel dwell time during the fast scanning, is to reduce the scan time on the useless region as more as possible, i.e., random-access scanning, achieved by DMD-based microscope illustrated in FIG. 2. As shown in FIG. 2(b), the scan trajectories are discontinuous and could be arbitrarily designed, by rapidly switched binary patterns in FIG. 2(c).

Axial scanning along the optical axis (i.e., z-axis) is realized by applying binary holograms of spherical wavefronts of increasing or decreasing focal lengths:

$$\varphi(x, y) = \frac{\pi(x^2 + y^2)}{\lambda f} \tag{4}$$

where $\lambda$ is the wavelength and f is the focal length of the spherical wavefront. Binary holograms of the spherical wavefronts in Eq. (5) are generated based on Lee holography; and can be calculated as $$h(i, j) = \begin{cases} 1, & -\frac{q}{2} \leq \frac{R(x, y)}{T} + \frac{\varphi(x, y)}{2\pi} + k \leq \frac{q}{2} \\ 0, & \text{otherwise} \end{cases} \tag{5}$$

where h(i, j)∈{0, 1}, (1≤i≤m; 1≤j≤n; i and j∈N) represents the pixels on the DMD; 1 and 0 refer to the "on" and "off" states respectively; m and n refer to the number of rows and columns respectively; T is the grating period of the hologram; k is an integer; and q (0≤q≤½) is a constant that determines the widths of the fringes.

Figure 3:
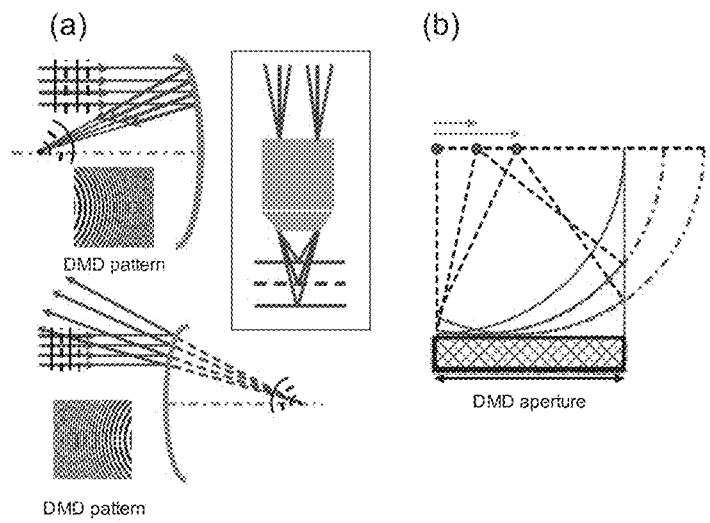
FIG. 3 illustrates axial scanning and lateral scanning based on binary holography.

Lateral scanning can be realized by changing the tilted phase term, i.e., R(x,y)/T in Eq. (4), as R(x,y) determines the bias and tilted angle of the fringe patterns and T determines the period of the fringes. In other words, T may be used to control the separation of diffracted beams from the $0^{th}$ diffraction order. FIG. 3(a) illustrates working principle of axial scanning based on binary holography, where the focal point can be scanned along the axial direction corresponding to the convergence or divergence of the spherical wavefront. FIG. 3(b) illustrates the working principle of lateral scanning: to scan the focal point from left (red point) to right (green point), assuming T is constant, one only needs to reduce the value of R(x,y). By appropriately selecting the values of R(x,y) and T, lateral scanning in both x- and y-axes can be achieved. In combination with the axial scanning, three-axis random-access scanning can be realized by using a single DMD. When selecting design parameters, it is worthwhile to note that a large T value may cause the diffracted beams to overlap in space, while a small T value may cause the tilted phase term to exceed the range of the inequality in Eq. (5), and thus no modulation will be performed.

As the DMD scanner is capable of scanning arbitrary paths in space, all conventional scanning strategies, e.g., raster, spiral, or Lissajous scanning trajectories, can be easily implemented on the DMD platform. Besides single focus scanning, multiple foci could be superposed in a single binary hologram, following Eq. (6):

$$h(i, j) = \begin{cases} 1, & -A(x, y) \leq \sum_{k=1}^{n} B_k \sin\left(2\pi \frac{R_k(x, y)}{T_k} + \varphi_k(x, y)\right) \leq A(x, y) \\ 0, & \text{otherwise} \end{cases} \tag{6}$$

where $B_k$, $R_k(x,y)$, $T_k$ and $\phi_k$ are the relative amplitude factor, tilted phase, grating period, and phase for the $k^{th}$ focal point respectively.

Multi-Depth and Omnidirectional Imaging

Figure 4:
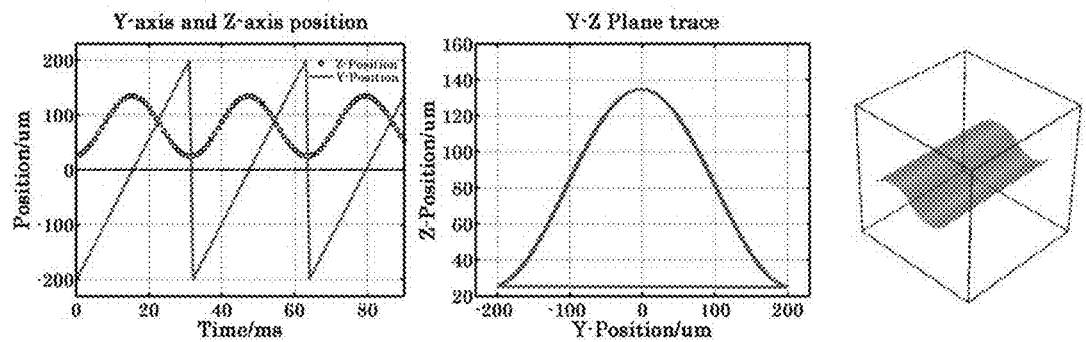
FIG. 4 is an illustrative example of a curved imaging plane achieved by properly synchronizing the motion of y-scanner and the variation of the wavefront focal length of the apparatus shown in FIG. 1.
Figure 5:
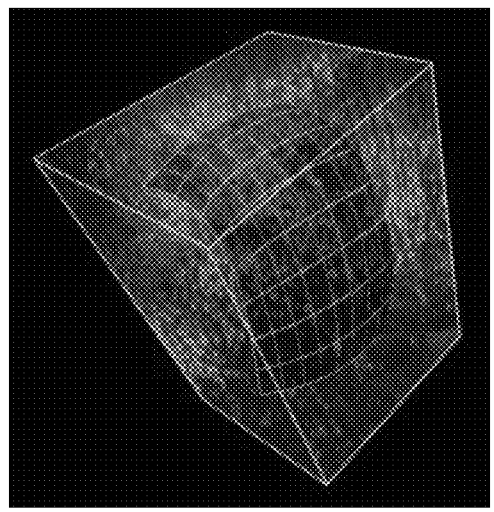
FIG. 5 is an illustrative example of imaging neural network in 3-D by omnidirectional imaging of the apparatus shown in FIG. 1.

Since the update rate of the DMD is compatible with that of the fast x-scanner, i.e. the polygon mirror, real time multi-depth and omnidirectional imaging in 3-dimentional (3-D) space can be realized. Specifically, for omnidirectional imaging, during a raster x-y scan, each pixel can be assigned a specific z position which forms an arbitrary surface. FIG. 4 shows an example of a curved imaging plane achieved by assigning a proper focal length f to the spherical wavefront. FIG. 5 is an illustrative example of imaging neural network in 3-D by omnidirectional imaging of the apparatus shown in FIG. 1.

These ultrafast z-scanning enabled techniques, i.e. multi-layer imaging and omnidirectional imaging, are powerful tools for biomedical imaging. For example, omnidirectional imaging can be used to study the neural network activities in real time by conforming imaging plane to follow certain 3-D neural network in space as shown in FIG. 5.

Optical Stimulation for Optogenetics

Figure 6:
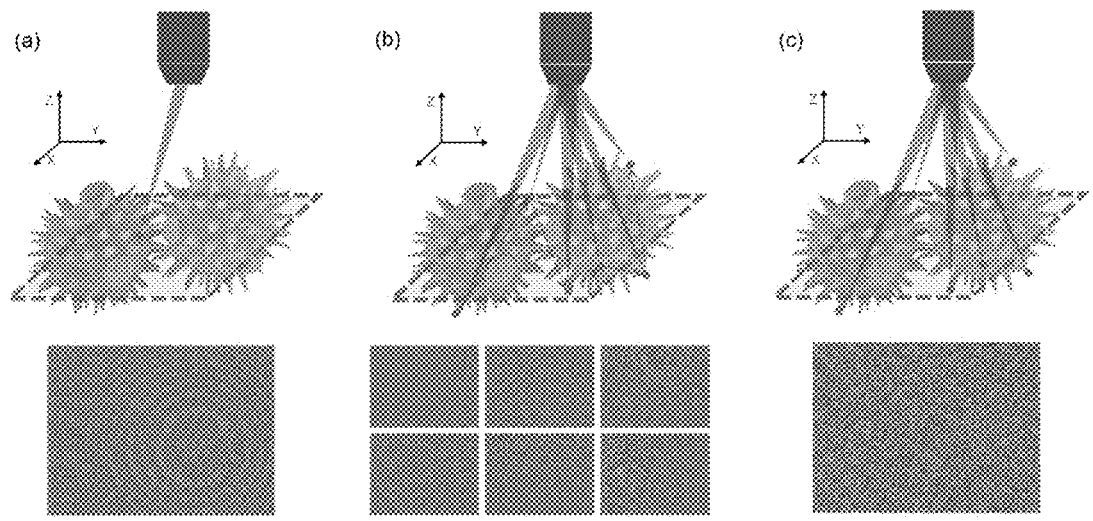
FIG. 6 illustrates three-dimensional holography-based optical stimulation with alternative real time imaging.

For current optogenetics purpose, the optical stimulation process is usually achieved by a pair of galvanometric mirrors. Accordingly, the precision and speed of the stimulation point is principally limited by the mechanical movement error and response of rotating mirrors. In contrast, the DMD-based femtosecond laser steering mechanism could make it easy to approach the exact target position with high and uniform speed (22.7 kHz) by binary holograms. Importantly, three-dimensional manipulation and parallel multi-focus generation with arbitrary dosage control can be easily realized by calculating proper holography patterns within the work volume of the DMD scanner. FIG. 6 shows three photostimulation strategies in 3D space that could be realized by the DMD scanner, where each strategy corresponds to different groups of calculated holograms. FIG. 6(a) illustrates single-point optical stimulation with one hologram pattern. FIG. 6(b) illustrates sequential multi-focus optical stimulation with 6 hologram patterns. FIG. 6(c) illustrates simultaneous multi-focus optical stimulation with one hologram pattern.

Figure 7:
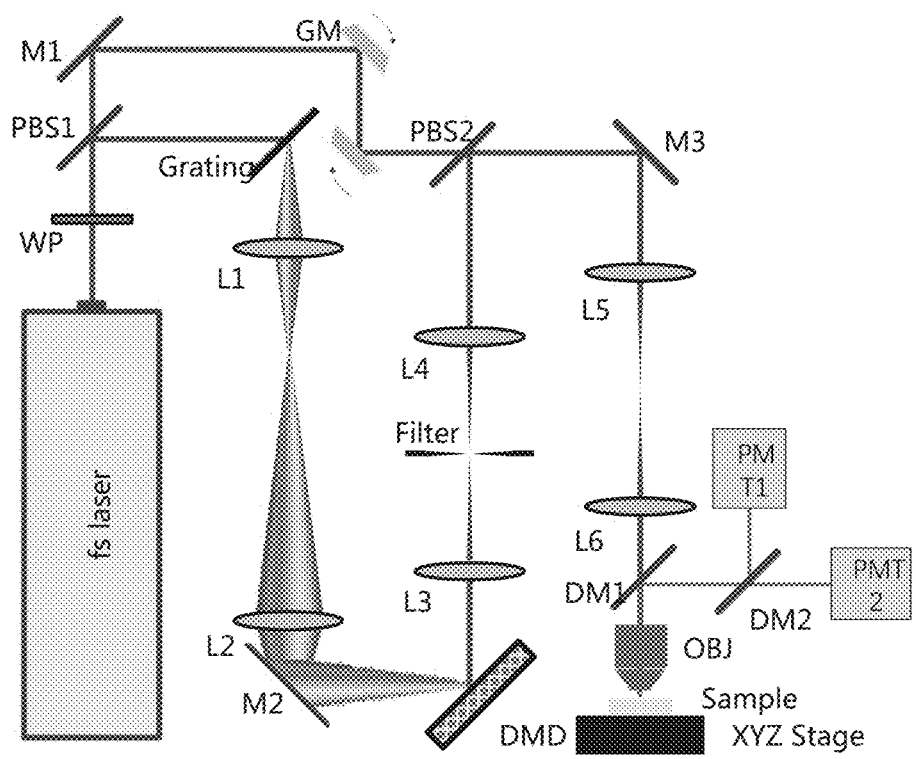
FIG. 7 illustrates an apparatus for laser beam shaping and scanning according to some embodiments of the disclosure.

As described in above embodiments, three-dimensional manipulation and parallel multi-focus generation may be realized by using the same optical configuration shown in FIG. 1. For optogenetics application, the scanning points are used for optical stimulation. Equations (5) and (6) are also utilized to explain and indicate the mathematical derivation. Meanwhile, A(x, y) in Eq. (6) represents the intensity distribution of all stimulation points which are wanted to be injected into the target sample. Besides, the project time of DMD chip could easily be applied to adjust the laser dosage directly. As shown in FIG. 7, in the apparatus combining DMD scanner and galvo pair, the laser source is split into two independent beams. One beam enters the galvo pair and performs standard video-rate fluorescent imaging (i.e., flat imaging plane, grey dash line region in FIG. 6); and other beam enters the DMD-scanner and can be split into 1 to 50 focal points to perform optical stimulation. There is a real-time view/window of the specimen for the user to move this window around in the specimen via the XYZ stage to locate targets of interest. Once identified, all selected targets could be stimulated by choosing them on the real-time screen and specifying the stimulation parameters such as power, duration, frequency, and time of application. Thanks to the nature of femtosecond laser, the application of the laser dosage is depth resolved with a resolution of <1 $\mu m^3$. Comparing with the existing methods of optogenetics and photostimulation, this DMD based microscope brings a major breakthrough with high flexibility because the conventional optical stimulation suffers from not only single point in 2D focal plane but also low precision and repeatability.

Large FOV 3D Programmable Imaging

Figure 8:
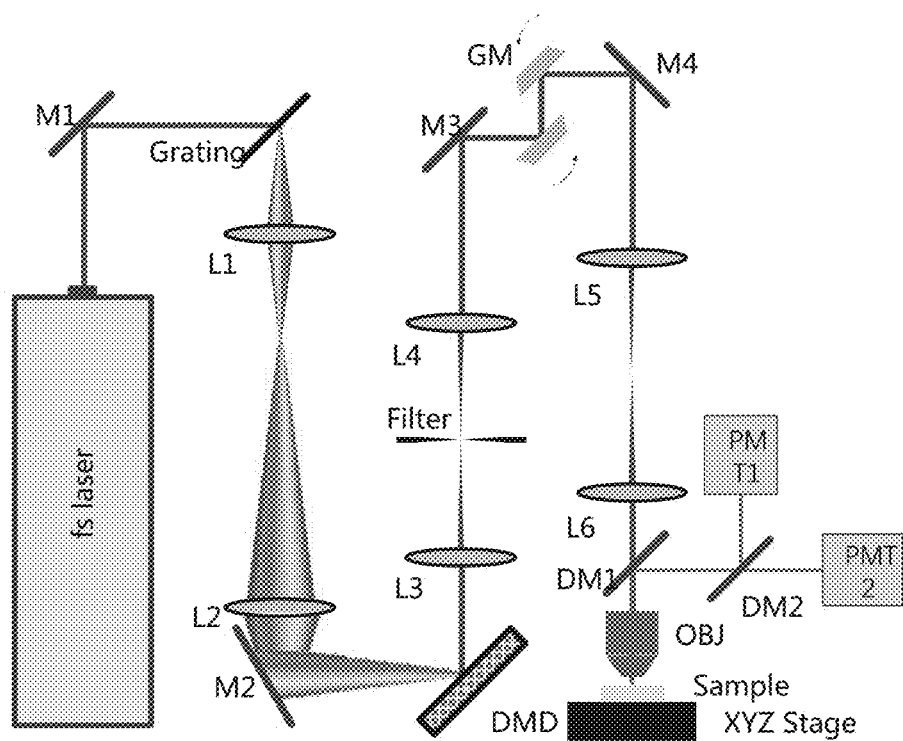
FIG. 8 illustrates an apparatus for laser beam shaping and scanning according to some embodiments of the disclosure.
Figure 9:
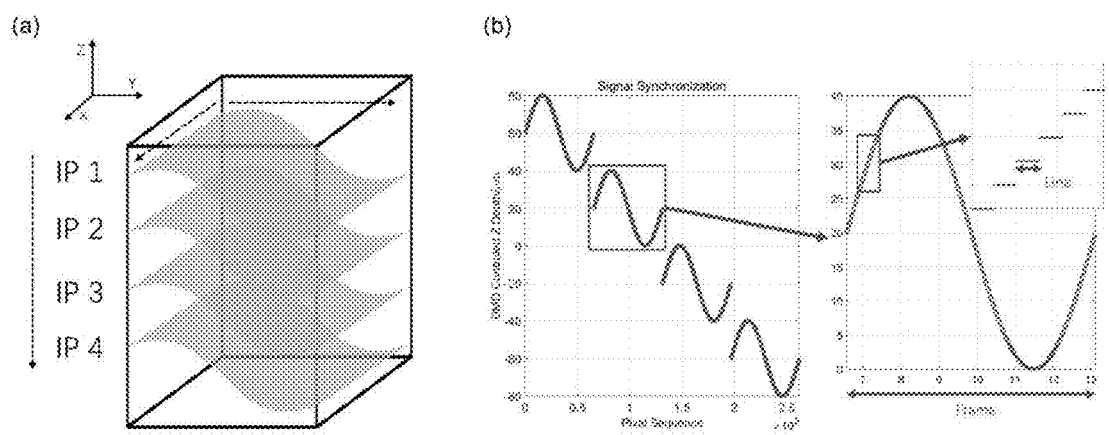
FIG. 9 illustrates the large FOV 3D programmable imaging principle and its synchronization process for combined scanning system.

Due to the high speed of DMD actuation and its digital signal process, the imaging capability can be highly extended by integrating DMD scanner and traditional 2D scanner, i.e. a pair of galvanometric mirrors. Taking the advantages of both the 3D dimensional manipulation of DMD scanner and the large scanning range of 2D scanner, large field of view (FOV) 3D programmable imaging is achievable via synchronizing and programming two sets of scanners properly. In the apparatus shown in FIG. 8, the laser beam first passes through the DMD and subsequently enters the galvo pair. Since the DMD could act as a discrete ultrafast axial scanner (FIG. 3(a)) which is strictly synchronized with the galvo scanner, Z positions are assigned to every pixel, line or frame of the raster scanning coordinate. Hence, Large FOV 3D programmable imaging, including multi-plane scanning and arbitrarily defined imaging plane, could be easily achieved with extreme flexibility. FIG. 9 illustrates the large FOV 3D programmable imaging principle and its synchronization process for combined scanning system. FIG. 9(a) illustrates large FOV programmable imaging trajectory in 3D space combined by 2D scanner and DMD scanner, where IP denotes imaging plane. FIG. 9(b) illustrates the synchronization between DMD controlled depths and sampling sequence of each pixel, line and frame.

When pairing with a pair of galvo scanner and a 40× objective, the whole effective imaging volume for flexible programming is 612, 612, 524 μm in the X, Y, Z axes; and a scanning resolution (i.e., minimum step size) of 270 nm and 150 nm in the axial and lateral directions respectively. This function may enable new scientific studies; for example, to image and follow neuron axons (not in the same plane) in a brain in vivo and observe their signaling processes.

Wavefront Correction in Adaptive Optics

DMD can also act as an adaptive element for wavefront correction in microscopy. Using the DMD, wavefront control phases can be designed and added to the scanning holograms via superposition, enabling the point-specific wavefront correction. To perform wavefront correction, the aberration is first determined either by a wavefront sensor or by indirectly optimizing, which correspond to sensing adaptive optics or sensorless adaptive optics respectively. After that the aberrated wavefront can be superposed to the scanning wavefront and converted to binary holograms. Lee holography may be used to control the laser focal point in space in a discrete fashion, and each calculated hologram corresponds to a specific point in space. In brief, binary holograms can be calculated as Eq. (5).

To combine wavefront correction and random-access scanning, taking axial scanning as an example, the spherical wavefront and an arbitrary aberrated wavefront may be superposed, as described in Eq. (7), $$\phi(x, y) = \phi_{aber}(x, y) + \frac{\pi(x^2 + y^2)}{\lambda f} \quad (7)$$

Figure 10:
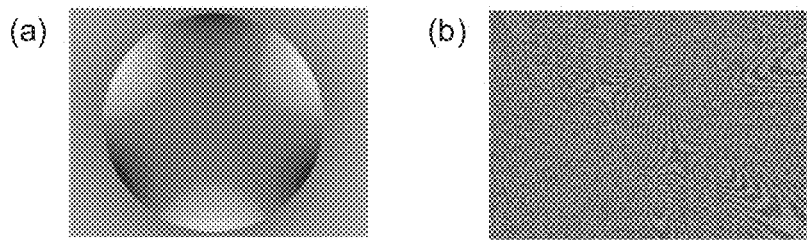
FIG. 10 illustrates examples of a calculated Zernike wavefront superposed to a spherical wavefront of a radius of 20 mm.

In practice, the arbitrary aberrated wavefront can be considered as a summation of orthogonal modes, e.g., Zernike polynomials, as described in Eq. (8), $$\phi(x, y) = \sum_{j=1}^{N} \alpha_j Z_j + \frac{\pi(x^2 + y^2)}{\lambda f} \quad (8)$$

where $\phi(x, y)$ represent the superposed wavefront; $Z_j$ is the $j^{th}$ Zernike mode, $\alpha_j$ is the coefficient of the $j^{th}$ Zernike mode, $\lambda$ is the wavelength; and f is the focal length of the spherical wavefront. Substituting Eq. (8) into Eq. (5), one can find the binary hologram for simultaneous scanning and wavefront correction. FIG. 10 presents examples of a calculated Zernike wavefront superposed to a spherical wavefront of a radius of 20 mm. FIG. 10(a) shows a phase; and FIG. 10(b) shows DMD pattern of a spherical wavefront superposed with calculated Zernike modes As an adaptive element for wavefront correction, besides work individually both as a scanner and for wavefront correction, DMD can also combine with other laser beam scanner, such as galvo mirror, polygon mirror, mechanical stage. In this case, the DMD is no longer a scanner and only perform as an adaptive element for wavefront correction, which can be used to correct the aberration for whole frame image.

Method for Laser Beam Shaping and Scanning

Figure 11:
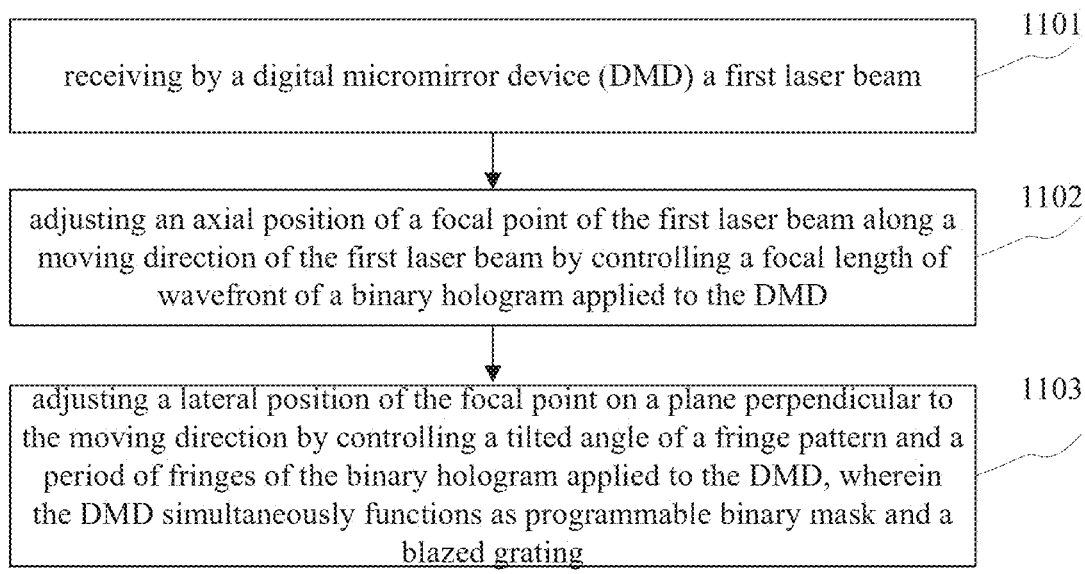
FIG. 11 illustrates a flow chart of a method for laser beam shaping and scanning according to some embodiments of the disclosure.

FIG. 11 illustrates a flow chart of a method for laser beam shaping and scanning according to some embodiments of the disclosure. The method includes steps 1101 and 1103. Step 1101 includes: receiving, by a digital micromirror device (DMD), a first laser beam. Step 1102 includes: adjusting an axial position of a focal point of the first laser beam along a moving direction of the first laser beam by controlling a focal length of wavefront of a binary hologram applied to the DMD. Step 1103 includes: adjusting a lateral position of the focal point on a plane perpendicular to the moving direction by controlling a tilted angle of a fringe pattern and a period of fringes of the binary hologram applied to the DMD, where the DMD simultaneously functions as programmable binary mask and a blazed grating.

Figure 12:
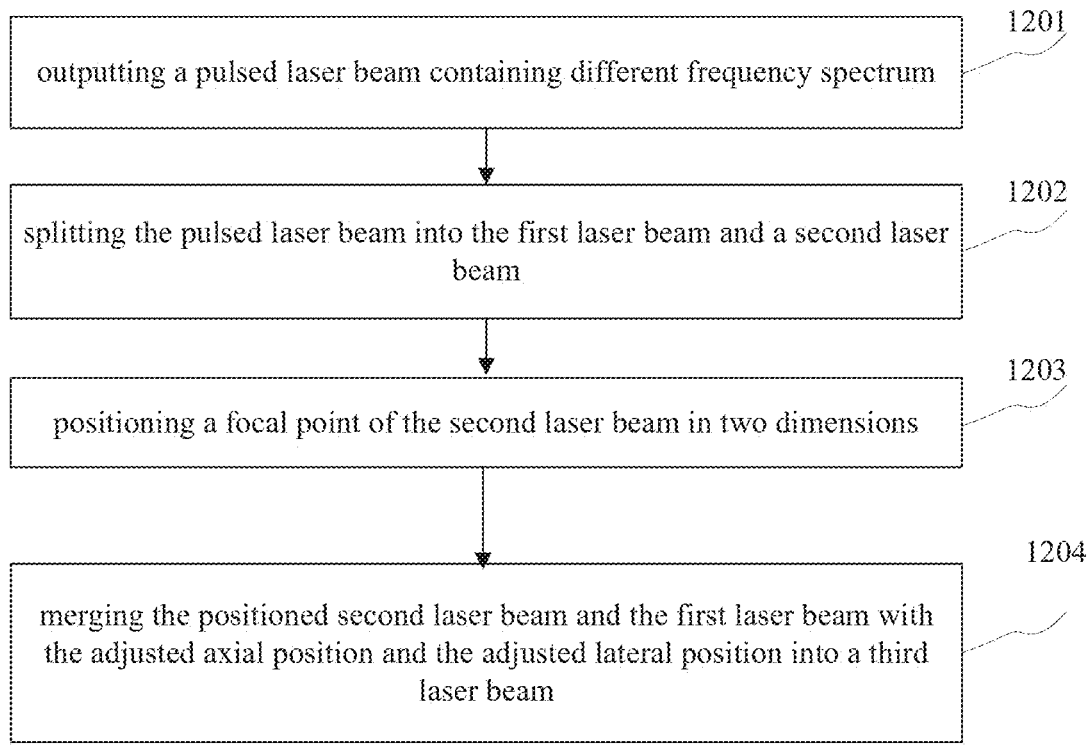
FIG. 12 illustrates a flow chart of additional steps of the method shown in FIG. 11 according to some embodiments of the disclosure.

FIG. 12 illustrates additional steps of the method shown in FIG. 11 according to some embodiments. Besides steps 1101 to 1103, the method further includes steps 1201 to 1204. Step 1201 includes outputting a pulsed laser beam containing different frequency spectrum. Step 1202 includes splitting the pulsed laser beam into the first laser beam and a second laser beam. Step 1203 includes positioning a focal point of the second laser beam in two dimensions. Step 1204 includes merging the positioned second laser beam and the first laser beam with the adjusted axial position and the adjusted lateral position into a third laser beam.

Figure 13:
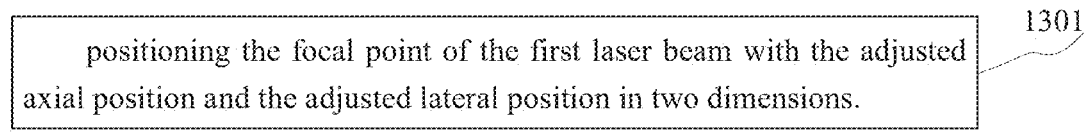
FIG. 13 illustrates a flow chart of additional steps of the method shown in FIG. 11 according to some embodiments of the disclosure.

FIG. 13 illustrates an additional step of the method shown in FIG. 11 according to some embodiments. Besides steps 1101 to 1103, the method further includes step 1301. Step 1301 includes positioning the focal point of the first laser beam with the adjusted axial position and the adjusted lateral position in two dimensions.

Figure 14:
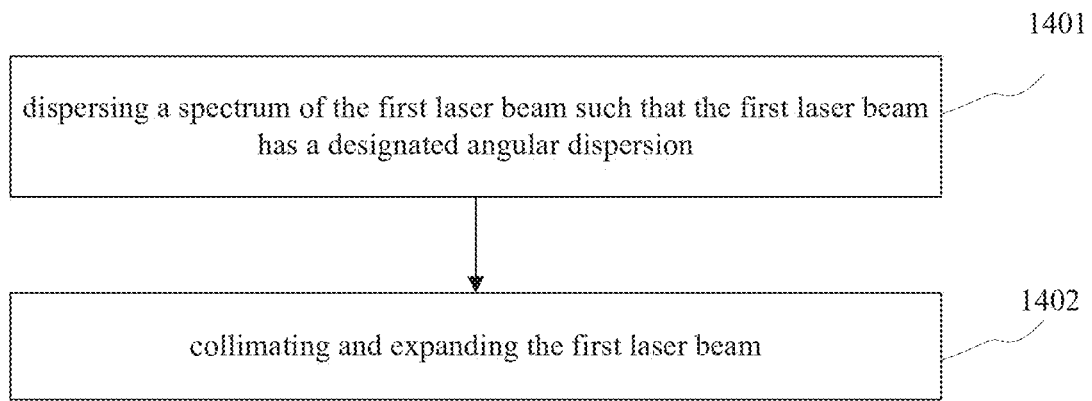
FIG. 14 illustrates a flow chart of additional steps of the method shown in FIG. 11 according to another embodiment of the disclosure.

FIG. 14 illustrates additional steps of the method shown in FIG. 11 according to some embodiments. Besides steps 1101 to 1103, the method further includes steps 1401 and 1402. Step 1401 includes dispersing a spectrum of the first laser beam such that the first laser beam has a designated angular dispersion. Step 1402 includes collimating and expanding the first laser beam.

Comparison with Existing Product

Shaping CW laser beam, or monochromatic beam, has been well studied to generate various wavefront such as Bessel beam, Airy beam, and LG beam etc. However, a mature and effective method to shape the beams of a pulsed laser has yet to be developed despite the fact that pulsed lasers have many applications for both industry and academia. In addition, the apparatus according to some embodiments can also be used to shape CW lasers. Overall, the apparatus according to some embodiments is low cost and has significant advantages over conventional beam shaping technologies. The following sessions will compare the apparatus according to some embodiments with existing beam shaping technologies.

Shaping pulsed laser beam with SLM, especially liquid crystal-based SLM (LCSLM), is one of the most adopted shaping methods and commercially available. This method is effective, robust and dispersion-free. However, it has the following drawbacks compared with the apparatus according to some embodiments:

a) The refresh rate of a LCSLM is much lower. An SLM typically runs at a refresh rate of 60 frame-per-second (fps) and the best one runs at 200 fps. On the contrary, a DMD can operate at a refresh rate of 4-32 kHz, which is higher than the SLM by at least an order of amplitude.

b) LCSLM has a limited bandwidth. The bandwidth of an SLM is determined by the transmission characteristics of its liquid crystal (LC) layer, so the bandwidth is usually narrow and extremely difficult to extend to ultraviolet (UV) range. On the other hand, the bandwidth of a DMD is solely dependent on the coating of the micromirrors and can be tuned and extended to UV or infrared at low cost.

c) LCSLM has a lower damage threshold. Generally, an SLM may be damaged in three ways: (1) thermal damage of LC caused by high average power, (2) abrasion damage of the dielectric or aluminum layer caused by high peak power, and (3) photochemical damage caused by illuminating LC molecules with UV light at a wavelength less than 300 nm. For a DMD, it can take much higher average/peak laser power before any damage occurs.

d) LCSLM is expensive. In most cases, an LCSLM costs no less than 10,000 US dollars while a DMD is available at a price of around 500 US dollars or less.

e) LCSLM cannot modulate/shape phase and amplitude simultaneously. A single SLM can only modulate either phase or amplitude at a time unless two are employed simultaneously. However, this setup substantially decreases diffraction efficiency as well as increases the cost. In comparison, a single DMD itself is capable of shaping phase and amplitude simultaneously at low cost.

A DM is a mirror with a deformable surface that is controlled by the force of actuators beneath the surface, mechanically or electrostatically. Experiments have been performed to shape smoothly varying phase with a DM. Nevertheless, several intrinsic limits of the DM confine its usage to a handful of applications while the DMD is more versatile.

a) A DM has limited pixels/actuators (100 s~1000 s pixels). The number of actuators determines the sampling rate and resolution in constructing an arbitrary wavefront. Unfortunately, this number is typically less than a few hundreds, so it is not practically to precisely shape a fast changing wavefront with the DM. In contrast, the number of pixels of a DMD usually is at the level of a million or higher, e.g. 1280*800, so the DMD can shape extremely distorted wavefront with a high resolution.

b) A DM is more expensive (10 k to 100 k USD). The DMD is much cheaper than a DM as DMD is a matured device.

c) A DM-based pulse shaper cannot effectively compensate dispersion when the pulse duration/width is long. The DM works well when shaping a laser beam with short pulse width. However, when the pulse width is stretched longer, e.g. 200 femtoseconds (fs), significant dispersion will occur. For the DUBS, a dispersion compensation unit is included in the system which is not sensitive to pulse width, and thus no additional dispersion will be introduced to the beam shaping process.

According to the above, the apparatus according to some embodiments is a low-cost, high-speed, highly efficient, and robust pulse shaping device, which can be widely used in industrial applications and scientific research. The apparatus according to some embodiments provides precision control over the wavefront of a pulsed laser beam at ultrafast speed (32 kHz).

Application examples of the apparatus according to some embodiments include but not limited to the following cases:

a) Axial scanning (z-scanning) as well as lateral scanning (x- or y-scanning) by generating spherical wavefronts (with different radii) and tilted phases respectively. Take z-scanning as an example, the dynamic binary mask can be viewed as a lens with tunable focal length. Changing the radius of a spherical wavefront causes the laser beam to converge or diverge, which subsequently controls focal length. Since high-speed axial scanning is a long-sought goal in both biomedical imaging and manufacturing, e.g. 3D printing, this technique may generate significant impact in these two fields. Combining the x, y, and z scanning, random-access scanning can be achieved.

b) Simultaneous omnidirectional imaging and optical stimulation can be achieved by including an "optical switch", e.g. acoustic-optic modulator (AOM), on the basis of (a). An AOM is a device that can deflect incident beam to different orientations thereby controlling the "ON/OFF" state of the beam. As a result, combining axial scanning and optical switching together will enable three-dimensional simultaneous imaging and stimulation. This technique will have a profound impact on biological studies and clinical applications, such as the study of neural networks, optogenetics and neuronal degeneration diagnose etc.

c) Generating various typical or arbitrary beam profiles. The DUBS can shape a pulse laser beam into Bessel beam, Airy beam, LG beam and any other types of profiles. Particularly, Bessel beam and Airy beam will not diffract when they propagate, often referred as "light bullet", so they are very promising to increase the penetration depth in microscopy. Besides, Bessel, Airy and LG beam are proved useful in optical tweezer, molecule manipulation, and extending field-of-view (FOV) or achieving super-resolution in microscopy etc. These beam profile can also be combined with axial scanning shown in FIG. 3(a). For instance, when LG beam is combined with axial scanning shown in FIG. 3(a), a microscope that can rapidly scan in the axial direction beyond the diffraction limit would be possible. Furthermore, even an arbitrary image can be reconstructed with a pulsed laser in our invention, which can find use in the fields of holography and laser art.

d) Wavefront correction. Wavefront correction is often used in "Adaptive Optics" (AO). Conventional AO utilized a DM as the key correction component. This technique is indispensable to astronomical telescopes, laser communication systems and microscopy etc. Using the DUBS, an incoming distorted wavefront can be detected and corrected. Our invention is superior to DM-based AO with higher resolution and lower cost.

Preliminary experimental data show that the apparatus according to some embodiments can completely compensate dispersion and shape a pulsed laser beam to any desired wavefront with a high resolution.

Figure 15:
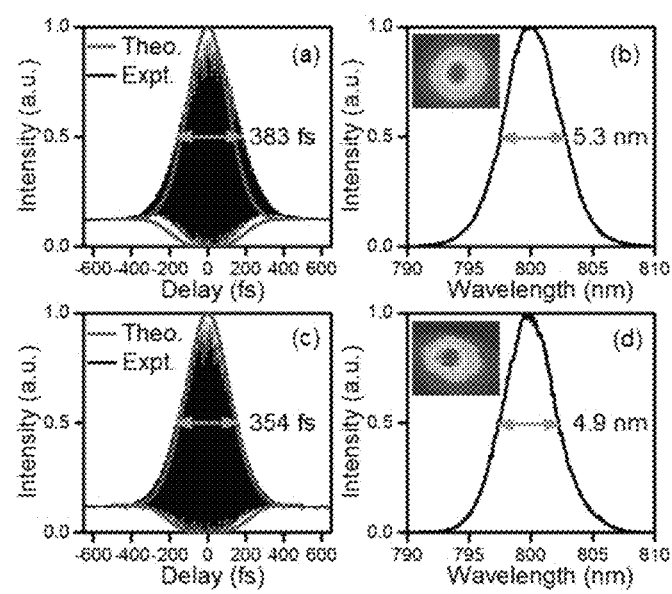
FIG. 15 illustrates measured autocorrelation curves obtained of the apparatus shown in FIG. 1.

To assess the effectiveness of dispersion compensation, the pulse width of the laser beam before the grating and after the DMD is measured using an autocorrelator (e.g. Pulse-Check USB 50, APE, Germany). As shown in FIG. 15(a)-(b), the autocorrelation curves of the beam before the grating and those after the DMD have a full width at half maximum (FWHM) close to the other. The comparison confirms that dispersion compensation is effective. In addition, the FWHM of the curve after the DMD is slightly smaller than the one before the grating by ~30 fs. This indicates that the dispersion compensation is also capable of removing dispersion caused by other sources, such as the intrinsic chirp of the laser source or misalignment.

In particular, FIG. 15(a) illustrates theoretical (red) and experimental (black) autocorrelation curves of the input beam before the grating. FIG. 15(b) illustrates spectrum of the input beam; Inset: Intensity distribution of the input beam. FIG. 15(c) illustrates theoretical (red) and experimental (black) autocorrelation curves of the output beam departing from the DMD at $-1^{st}$ diffraction order of the hologram. FIG. 15(d) illustrates spectrum of the output beam; where Inset denotes Intensity distribution of the output beam.

The DMD microscope provides numerous high-impact functionalities, i.e., multi-plane imaging, curved plane imaging, real-time simultaneous imaging and stimulation, and wavefront correction, which substantially improve the imaging resolution and quality especially for in vivo deep tissue imaging. Besides imaging, the DMD-scanner enables the microscope to directly "interact" with biological specimens by performing single- or multi-focus optical stimulations, laser cutting, or laser ablation with a precision of <1 $\mu m^3$, which cannot be done in any state-of-the-art commercial systems. In the following sections, we compare the DMD microscope with state-of-the-art commercial two-photon microscopes from the leading suppliers, including Nikon, Leica, Olympus, ZEISS, Thorlabs, and Femtonics.

Table 1 presents a comparison between the DMD microscope's new functionalities with comparable commercial microscope models. The results show that most of the advanced new functions of the DMD microscope are not provided by the current commercial systems.

For random-access scanning, only Femtonics 3D-AO offers this capability. Notably, the 3D-AO system uses a different technology to achieve random-access scanning, i.e., combination of four acousto-optic deflectors (AODs). The AOD-based system can scan at up to 50 kHz but the point spread function is compromised, i.e., PSF(z) ~7 $\mu m$, due to the severe dispersion of the pulsed laser. In addition, the AOD-based system can only perform single-point scanning. In comparison, the DMD-scanner according to some embodiments can perform multi-focus scanning at 22.7 kHz without compromising the resolution.

For wavefront correction, most companies offer it as an advanced solution, where the adaptive optics module is typically designed based on liquid crystal-based spatial light modulators (LC-SLM), which is slow (100 Hz) and expensive. In comparison, the DMD microscope according to some embodiments can provide point-specific wavefront correction, i.e., at each scanning point wavefront correction holograms calculated based on Zernike polynomial can be added to the scanning holograms to improve imaging results at a speed of 22.7 kHz; this is a default function included in the system.

TABLE 1

Comparison of the advanced functionalities between the DMD Microscope and other state-of-the-art systems from the leading providers.

| Product/ Modes of Operation | ZEISS LSM880 | Leica TCS-SP8 | Nikon A1MP | Olympus FVMPE-RS | Thorlabs Bergamo | Femtonics AO-3D | DMD system |
|---|---|---|---|---|---|---|---|
| Random Access Scanning 3D | x | x | x | x | x | ✓ | ✓ |
| Multi-Plane Imaging | x | x | x | x | x | x | ✓ |
| Curved Plane Imaging | x | x | x | x | x | x | ✓ |
| Simultaneous Real-time Imaging + Multi-focus Stimulation | x | x | x | x | x | x | ✓ |
| Wavefront Correction | (Optional) | (Optional) | (Optional) | (Optional) | (Optional) | (Optional) | ✓ |
| 2D/3D Volume Imaging based on Raster Scanning | ✓ | ✓ | ✓ | ✓ | ✓ | ✓ | ✓ |

Table 2 compares the performance of the random-access scanners designed based on the DMD and AOD devices. The comparison is based on scanning a single laser focus as the AOD-scanner cannot simultaneously control multiple laser foci. For multi-focus scanning, the DMD-scanner according to some embodiments basically has the same work volume and scan rate as for the single point scanning.

TABLE 2

Comparison of AOD- & DMD-based random-access scanners for single focus scanning

| Single-point Random Access Scanning Performance (for a 20x objective lens) | Femtonics 3D-AO | DMD system |
|---|---|---|
| Scanning Volume (In Vivo) | 500 × 500 × 650 μm³ | 206 × 412 × 650 μm³ |
| Scanning Volume (Transparent Samples) | 800 × 800 × 1400 μm³ | 206 × 412 × 1000 μm³ |
| Spatial Resolution (Center) | 0.4 × 0.4 × 2.4 μm³ | 0.4 × 0.4 × 1.5 μm³ |
| Spatial Resolution (Edges)* | 1.9 × 1.9 × 7.9 μm³ | 0.4 × 0.4 × 1.5 μm³ |
| Scanning Speed | 30-50 kHz | 0-22 kHz |

*Note that the resolution of the DMD scanner remains constant throughout the work volume by applying the point-specific wavefront correction algorithm.

Table 3 presents the specifications of the real-time multi-plane imaging module of the DMD microscope, which is currently not offered by any other companies.

TABLE 3

Specifications of the multi-plane imaging module

| Multi-Plane Imaging | DMD system |
|---|---|
| Number of Planes | 1-200 |
| Min. Step Size | 1.5 μm |
| Max. Step Size* | 1000 μm |
| Angle Between Planes | −90° to +90° |
| Planes Switching Rate | 0-22 kHz |
| Pixel Clock | 10,000 kHz |

*Note that the DMD-scanner moves the focus to any point in the workspace at equal speed, i.e., ~44 μs Table 4 presents the specifications of the real-time 3-D programmable imaging plane (i.e., curve plane imaging) module of the DMD microscope, which is currently not offered by any other companies.

TABLE 4

Specifications of the 3-D programmable imaging plane module

| 3-D Programmable Imaging Plane | DMD system |
|---|---|
| Number of Points Along an Arbitrarily Defined Curve | 2048 maximum |
| Peak to Peak Distance (20x objective lens) | 1000 μm |
| Frame Scanning Rate | video rate |
| Pixel Clock | 10,000 kHz |

Table 5 presents the specifications of the simultaneous video-rate fluorescent imaging and multi-focus optical stimulation function of the DMD microscope. Note that some commercial systems offer stimulation as an optional module. However, it is often realized by introducing a parallel galvo-scanning system to provide a single-focus stimulation source, which is slow and less precise comparing to the multi-focus scanning DMD system. For the DMD system according to some embodiments, the number of foci is only limited by the laser power; custom-developed software allows users to choose the target of interests in the real time window, and specify the laser dosage as well as the modes of stimulation, e.g., continuous or pulsed.

TABLE 5

Specifications of the simultaneous video-rate imaging and multi-focus stimulation module

| Simultaneous Real-time Imaging + Stimulation (20x obj.) | DMD system |
|---|---|
| Work volume (In vivo) | 206 × 412 × 650 μm³ |
| Work volume (Transparent Samples) | 206 × 412 × 1000 μm³ |

TABLE 5-continued

Specifications of the simultaneous video-rate
imaging and multi-focus stimulation module

| Simultaneous Real-time Imaging + Stimulation (20x obj.) | DMD system |
|---|---|
| FoV of the real-time view window | 1000 × 1000 μm² |
| Stimulation Resolution | 0.4 × 0.4 × 1.5 μm³ |
| Stimulation Rate | Continuous or pulsed (22.7 kHz) |
| Number of Stimulating Foci | 1-10 |

Table 6 below provides a detailed comparison of the basic 2-D real-time imaging function, which is available in all microscope systems. Like other microscope systems, our custom-software allows users to automatically stitch 2-D or 3-D images.

TABLE 6

Specifications of the basic 2-D imaging function (galvo-scanning)

| Basic 2D Imaging (Raster-scanner with 20x obj.) | ZEISS LSM880 | Leica TCS-SP8 | Nikon A1MP | Olympus FVMPE-RS | Thorlabs Bergamo | Femtonics AO-3D | DMD system |
|---|---|---|---|---|---|---|---|
| Field of View (Diameter) | 1000 μm | 750 μm | 900 μm | 900 μm | 1000 × 1000 μm² | 800 μm | 1000 × 1000 μm² |
| Frame rate (512 × 512 pixels) | 19 fps | 28 fps | 30 fps | 30 fps | 30 fps | 0.2 fps | 1~30 fps |
| Max Resolution | 2048 × 2048 | 2496 × 2496 | 1024 × 1024 | 4096 × 4096 | 4096 × 4096 | n/a | 2048 × 2048 |

In some embodiments, a prototype system is developed for DMD microscope. Preliminary experimental data show that the results are repeatable and achieve much higher imaging throughput and flexibility than any existing systems.

Figure 18:
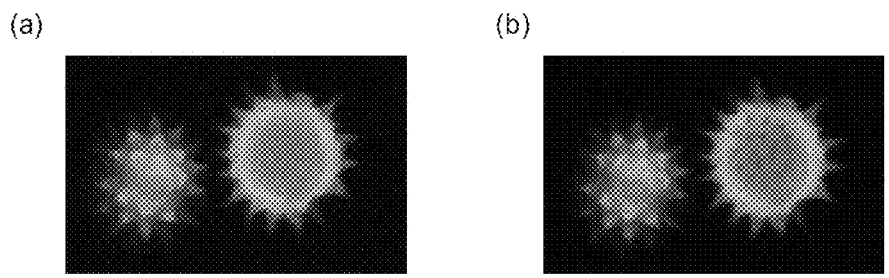
FIG. 18 illustrates real time fluorescence imaging for two unflowered pollens.

To validate the random-access effect, including its resolution and speed, four distant points are selected on a pollen sample to rapidly monitor their fluorescence signals. The binary patterns are generated according to the positions of selected points, then loaded to DMD, repetitively projected at the maximum DMD pattern rate (i.e., 22.7 kHz in this experiment). Random-access imaging results are shown in FIG. 18, where the time interval of the signals of each point is 44 μs, and the time gap between the adjacent points are much less than 44 μs, thus it can be confirmed that DMD scanner functions as an ultrafast 3-D random-access scanner, with discontinuous scanning trajectories regardless of the distance.

Figure 16:
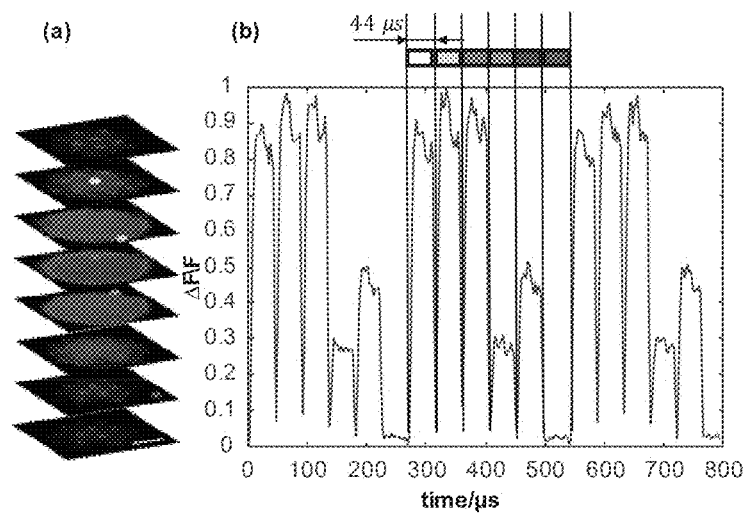
FIG. 16 illustrates random-access imaging experiments on a pollen grain.

FIG. 16(a) shows eight imaged layers of the pollen grain, where six distant points are selected at different layers with color labels, where the scale bar is 10 μm; and FIG. 16(b) shows recorded voltages (i.e., fluorescence intensities) of the selected points where the color bar associates the fluorescence data to specific points in FIG. 16(a).

Figure 17:
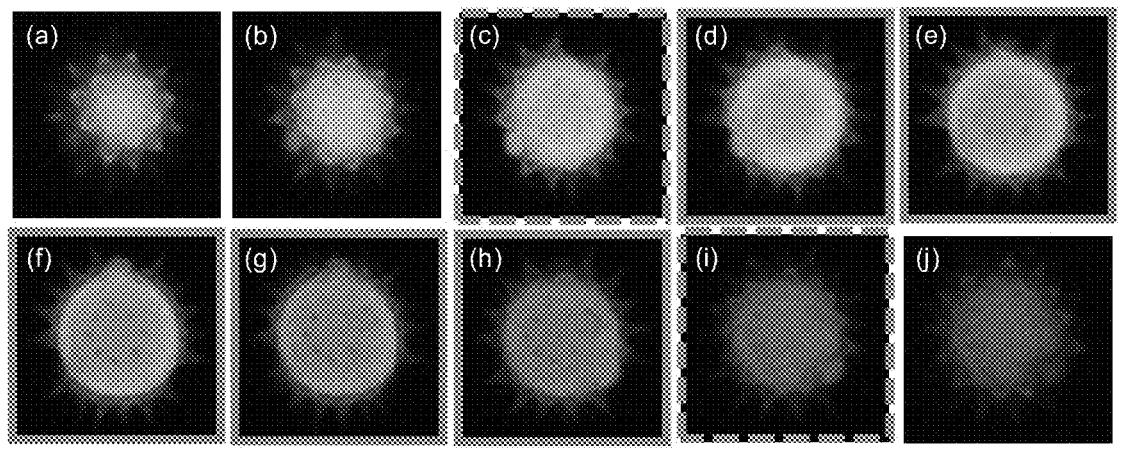
FIG. 17 illustrates fluorescence quenching on a unflowered pollen induced by DMD controlled optical stimulation in 3D space.
Figure 19:
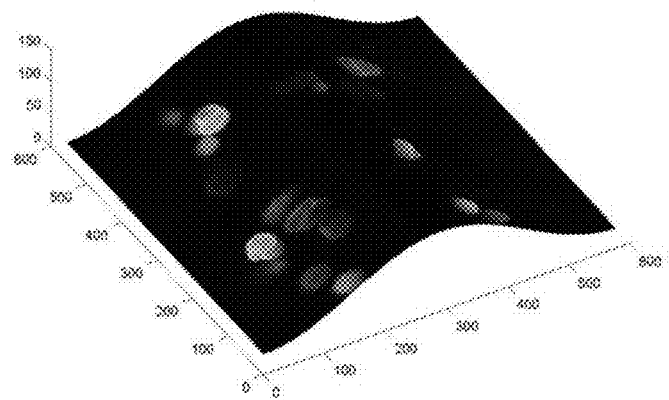
FIG. 19 illustrates an imaging result of large FOV 3D programmable imaging method.

To demonstrate the capability of 3D photostimulation, in some embodiments, the DMD scanner is programmed to stimulate 8 points inside the pollen at 8 different depths without any mechanical movement of the sample. Meanwhile, the galvo scanner is used to capture the real time images from 10 different depths (the axial distance to the middle layer is 10 μm, 8 μm, 4 μm, 0 μm, −2 μm, −4 μm, −6 μm and −8 μm, respectively) for the verification of the stimulation effect. As shown in FIG. 19, the upper point in these images are the closest one to the top of the pollen, and along the clockwise direction, each point is stimulated 1 μm lower. Each point is stimulated with the exposure time of 50 ms and the power of 10 mW. With the deeper imaging plane, these stimulated points sequentially appear and disappear along the clockwise direction, which means they are located in different layers of the 3D space. Because the axial size of focal point which is determined by optical diffraction limit is over 2 μm, there are more than one stimulated point appeared in each layer. The sub images with blue solid pane in FIG. 17 mean the points are clear enough to be recognized, in the meantime, the dash line panes indicate they are existed but indistinct. As shown in FIG. 17, real time 2D section images are captured by 2D scanner from the depth of (a) 10 μm, (b) 8 μm, (c) 6 μm, (d) 4 μm, (e) 2 μm, (f) 0 μm, (g) −2 μm, (h) −4 μm, (i) −6 μm and (j) −8 μm, which present the relative axial distance between the imaging plane and the middle of the pollen.

To further prove the ability of DMD based stimulation, the DMD scanner is controlled with one hologram pattern to generate 18 stimulation points in 3D space simultaneously. The obvious difference between FIGS. 18(a) and (b) indicates the existing of the stimulation result. The slightly different shapes and shades show these points are distributed three dimensionally. FIG. 18(a) illustrates real time fluorescence imaging for two unflowered pollens before DMD controlled simultaneous multi-focus optical stimulation in 3D space; and FIG. 18(b) illustrates real time fluorescence imaging for two unflowered pollens after DMD controlled simultaneous multi-focus optical stimulation in 3D space FIG. 19 is the imaging result of large FoV 3D programmable imaging method, which is realized by the synchronization of the DMD scanner and the Galvo scanner. The DMD scanner is responsible for the change of Z depth in the interval of Galvo line scanning, which makes it easy to curve the imaging plane to any arbitrary shapes. As shown in FIG. 19, three-dimensional curve imaging result synchronized by DMD scanner and galvo scanner, imaging range is 600 μm×600 μm×150 μm.

Figure 20:
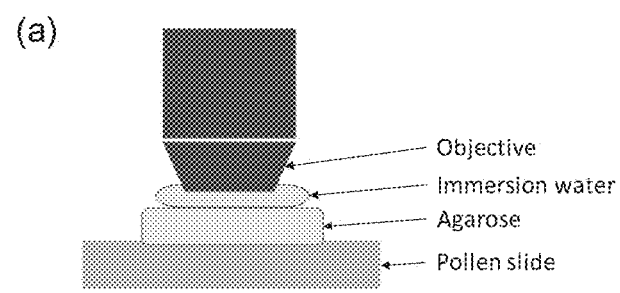
FIG. 20 illustrates an experiment using DMD to perform wavefront correction.
Figure 20:
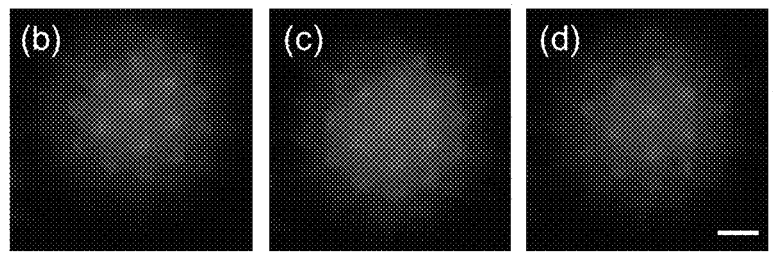

To validate the performance of the DMD for wavefront correction, imaging experiments on are performed a pollen grain sample (~25 μm, Sunflower Pollen, Vision Scientific) with a water dipping objective lens (CFI75 Apo LWD 25XW, Nikon). First, some aberration is purposely introduced to the system by inserting a layer of agarose of 1 mm thick between the pollen slide and objective lens, as illustrated in FIG. 20(a). FIG. 20(b)-(d) present the imaging results of the pollen sample. FIG. 20(b)-(c) present the imaging results "without" and "with" the agarose layer respectively, where one may observe the spikes on the pollen becomes slightly blurred in FIG. 20(c). FIG. 20(d) presents the imaging result with the agarose layer as well as the wavefront correction phase, i.e., the wavefront correction phase is superposed to the scanning hologram during the image acquisition process. From the result, one may find the spikes on the pollen are sharper than both FIG. 20(b)-(c). This is because for FIG. 20(d) the aberration from other sources are also corrected. FIG. 20(a) shows that layer of agarose is introduced between the pollen sample and the objective; FIG. 20(b) shows pollen imaging results without a layer of agarose; Figure (c) shows pollen imaging results with a layer of agarose; and FIG. 20(d) shows pollen imaging results with both a layer of agarose and wavefront correction phase.

The foregoing is only a description of the embodiments of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. An apparatus for laser beam shaping and scanning, comprising:
   a digital micromirror device (DMD) including a plurality of micromirrors, configured to receive a first laser beam; adjust an axial position of a focal point of the first laser beam along a moving direction of the first laser beam by controlling a focal length of wavefront of a binary hologram applied to the DMD; and adjust a lateral position of the focal point on a plane perpendicular to the moving direction by controlling a tilted angle of a fringe pattern and a period of fringes of the binary hologram applied to the DMD, wherein the DMD simultaneously functions as programmable binary mask and a blazed grating; and
   a dispersion compensation unit arranged before or after the DMD, including a blazed grating configured to disperse a spectrum of the first laser beam to transfer the first laser beam to the DMD with a designated angular dispersion for neutralizing an angular dispersion introduced by the DMD,
   wherein the dispersion compensation unit is arranged so that the designated angular dispersion is positive if the angular dispersion introduced by the DMD is negative and the designated angular dispersion is negative if the angular dispersion introduced by the DMD is positive.

2. The apparatus of claim 1, further comprising:
   a laser source, configured to output a pulsed laser beam containing different frequency spectrum;
   a first splitter, configured to split the pulsed laser beam into the first laser beam and a second laser beam;
   a two-dimensional (2D) scanner, configured to receive the second laser beam, and position a focal point of the second laser beam in two dimensions; and
   a second splitter configured to receive the first laser beam leaving the DMD and the positioned second laser beam from the 2D scanner, and merge the first laser beam leaving the DMD and the positioned second laser beam into a third laser beam.

3. The apparatus of claim 2, further comprising:
   a third lens L3 and a fourth lens L4, arranged between the DMD and the second splitter and configured to project the output second laser beam to the second splitter;
   a filter, arranged at a back focal plane of third lens L3 and configured to filter the output second laser beam from the DMD; and
   an imaging unit, configured to record and/or monitor a process of scanning a sample by the third laser beam.

4. The apparatus of claim 2, wherein the two-dimensional (2D) scanner comprises a plurality of polygon mirrors or a plurality of galvo mirrors.

5. The apparatus of claim 1, further comprising:
   a laser source, configured to output the pulsed first laser beam containing different frequency spectrum; and
   a two-dimensional (2D) scanner, configured to receive the first laser beam leaving the DMD, and position a focal point of the first laser beam leaving the DMD in two dimensions.

6. The apparatus of claim 5, further comprising:
   a third lens L3 and a fourth lens L4, arranged between the DMD and the 2D scanner and configured to project the first laser beam leaving the DMD to the 2D scanner;
   a filter, arranged at a back focal plane of third lens L3 and configured to filter the first laser beam leaving the DMD; and
   an imaging unit, configured to record and/or monitor a process of scanning a sample by the positioned first laser beam.

7. The apparatus of claim 5, wherein the 2D scanner comprises a plurality of polygon mirrors or a plurality of galvo mirrors.

8. The apparatus of claim 1, wherein the dispersion compensation unit further comprises a mirror configured to change a sign of angular dispersion of the first laser beam imaged to the DMD.

9. A method for laser beam shaping and scanning, the method comprising:
   receiving, by a digital micromirror device (DMD), a first laser beam;
   adjusting an axial position of a focal point of the first laser beam along a moving direction of the first laser beam by controlling a focal length of wavefront of a binary hologram applied to the DMD;
   adjusting a lateral position of the focal point on a plane perpendicular to the moving direction by controlling a tilted angle of a fringe pattern and a period of fringes of the binary hologram applied to the DMD, wherein the DMD simultaneously functions as programmable binary mask and a blazed grating; and
   dispersing a spectrum of the first laser beam using a dispersion compensation unit arranged before or after the DMD, including a blazed grating, to transfer the first laser beam to the DMD with a designated angular dispersion for neutralizing an angular dispersion introduced by the DMD,
   wherein the designated angular dispersion is positive if the angular dispersion introduced by the DMD is negative and the designated angular dispersion is negative if the angular dispersion introduced by the DMD is positive.

10. The method of claim 9, further comprising:
    outputting a pulsed laser beam containing different frequency spectrum;

splitting the pulsed laser beam into the first laser beam and a second laser beam;

positioning a focal point of the second laser beam in two dimensions; and merging the positioned second laser beam and the first laser beam with the adjusted axial position and the adjusted lateral position into a third laser beam.

11. The method of claim 10, wherein before adjusting the axial position and the lateral position of the focal point of the first laser beam, the method further comprises:

dispersing a spectrum of the first laser beam such that the first laser beam has a designated angular dispersion; and collimating and expanding the first laser beam.

12. The method of claim 9, further comprising positioning the focal point of the first laser beam with the adjusted axial position and the adjusted lateral position in two dimensions.

* * * * *